United States Patent Office 3,539,330
Patented Nov. 10, 1970

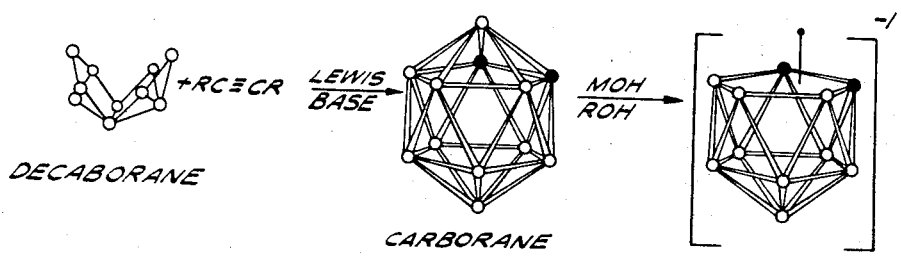
INVENTOR.
DONALD C. YOUNG

3,539,330
DEFOLIANT-DESICCANT CONTAINING DICARBADODECAHYDROUNDECABORATES
Donald C. Young, Fullerton, Calif., assignor to Union Oil Company of California, Los Angeles, Calif., a corporation of California
Filed Apr. 11, 1968, Ser. No. 720,729
Int. Cl. A01n 9/00
U.S. Cl. 71—70
9 Claims

ABSTRACT OF THE DISCLOSURE

A method for facilitating the harvesting of crops by applying to the crops an effective amount of an active defoliant and desiccant comprising dicarbadodecahydroundecaboric acid or its alkali metal or ammonium salts, wherein the active ingredient is the dicarbadodecahydroundecaborate anion having the following empirical formula:

$$[(BX)_m(BR_1)_nCR_2CR_3]^{-1}$$

wherein:

X is halogen or hydrogen;
$R_1$ is alkyl, aryl, alkenyl or halo alkyl having from 1 to about 5 carbons;
$R_2$ and $R_3$ are halogen, hydrogen or alkyl, aryl, alkenyl, carboxyl or cycloalkyl having from 1 to about 10 carbons;
$n$ is 0, 1 or 2; and
$m+n=9$.

The compositions are active for the defoliation and desiccation of a variety of plants including cotton, seed clover and alfalfa, milo, sugar cane, sugar beets, roses, potatoes, peppers and tomatoes. The preferred application because of the large volume of use is the defoliation and desiccation of cotton.

DESCRIPTION OF THE INVENTION

The invention relates to desiccant and defoliant compositions and in particular relates to such compositions having a high degree of activity.

The invention comprises compositions which contain as the active component dicarbadodecahydroundecaborate anions. The dicarbadodecahydroundecaborate anion, $(B_9H_9C_2H_2)^{-1}$, has the shape of an icosahedron with one missing apex which is formed by the carbon and boron atoms. The boron and carbon atoms lie in the vertices of the truncated icosahedron and a hydrogen atom is associated with the open face of the icosahedron.

The dicarbadodecahydroundecaborate anions are readily obtained from the icosahedron carborane structure by treatment of this carborane with an alkali metal hydroxide to abstract a boron atom therefrom. The carborane is in turn derived from decaborane by suitable treatment.

The preparation of the dicarbadodecahydroundecaborate anions is illustrated in the figure. In this diagram the boron atoms are unshaded and the carbon atoms are shaded. The small shaded spheres represent significant hydrogen atoms while the terminal substituents, $x$, $R_1$ or $R_2$, one of which is attached to each boron or carbon atom, have been omitted from the drawing. The dicarbadodecahydroundecaboric acid and its salts is prepared from decaborane or alkyl substituted decaborane by reaction with acetylene to produce the carborane which is then degraded with alcoholic base to abstract a boron atom and thereby form the dicarbadodecahydroundecaborate anion.

In the preparation of dicarborane, decaborane is purified by sublimation or recrystallization and dissolved in an organic solvent such as an ether. A Lewis base such as diethyl sulfide, acetonitrile, etc., is added to this solution and the solution is maintained at about 25°–85° C. for an extended period while acetylene is passed into contact with the solution. The reaction is as follows:

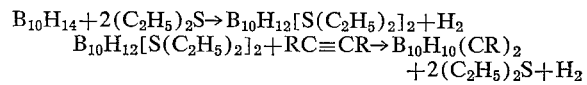

The reaction mixture is evaporated under vacuum to remove the Lewis base, e.g., diethyl sulfide, and the solvent. The product is dissolved in an inert solvent and reacted with concentrated hydrochloric acid to convert byproducts to hydrogen and borates. The crude dicarborane is recovered from the solvent by cooling and separating it as a solid. The solid product is washed with aqueous potassium hydroxide, filtered and dried. The dried solid is then extracted with a hydrocarbon solvent and purified dicarborane is crystallized as a solid from the hydrocarbon.

The product from the acetylene addition is 1,2-dicarbaclovododecaborane. Heating of this product neat or in an inert solvent to a temperature of about 500° C. will isomerize the 1,2-dicarborane to the 1,7-dicarborane isomer in substantially total yield. Heating of the 1,7-isomer to about 600° C. will cause further rearrangement to the 1,12-dicarborane. The carbollides of all these positional isomers possess pesticidal activity.

The dicarborane can be obtained with various substituents on the carbon atoms by the use of appropriately substituted acetylene. Thus bromomethyl dicarborane can be obtained by the use of propargyl bromide rather than acetylene in the aforedescribed preparation. Use of phenyl acetylene likewise provides phenyl dicarborane. In general, any substituted acetylene can be used in the preparation of the dicarboranes and thereby obtain a dicarborane having the same substituent on its carbon atom or atoms. Examples of suitable acetylenic reactants include amyl acetylene, amylmethyl acetylene, butyl acetylene, butylethyl acetylene, butylmethyl acetylene, chloro acetylene, decylmethyl acetylene, di-n-amyl acetylene, dibromo acetylene, dibutyl acetylene, diiodo acetylene, diethyl acetylene, dimethyl acetylene, diphenyl acetylene, dipropyl acetylene, divinyl acetylene, ethyl acetylene, ethylpropyl acetylene, n-heptyl acetylene, isopropyl acetylene, methylphenyl acetylene, n-propyl acetylene, vinyl acetylene, etc. These carbon substituted dicarboranes can be thermally isomerized to the 1,7- and 1,12-dicarboranes in the same fashion described in regard to the substituted dicarborane.

The dicarbadodecahydroundecaborate ion can be prepared from the 1,2- or the 1,7-dicarborane which can have hydrogen or any of the aforementioned substituents on the cage carbon atoms. The monovalent dicarbadodecahydroundecaborate anion is obtained by degradation of dicarborane with alcoholic base, e.g., alcoholic solution of potassium hydroxide, sodium hydroxide or piperidine. This is illustrated in the figure as the second step in the method. In this preparation, the dicarborane is dissolved in a suitable alcohol, e.g., methanol, ethanol, isopropanol, butanol, etc., which contains a strong alkali such as an alkali metal hydroxide or piperidine. The reaction is performed at ambient to reflux temperatures at atmospheric or superatmospheric pressure. The strong base abstracts a boron atom from the carborane which forms a borate ester with the alcohol and evolves hydrogen from the reaction mixture, as follows, with potassium hydroxide in methanol:

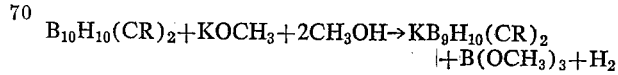

After hydrogen ceases to be evolved, the reaction mixture is cooled and the alkali metal dicarbadodecahydroundecaborate can be purified by precipitation of the excess alkali as the carbonate by saturating the solution with carbon dioxide, filtration, and evaporating the filtrate to dryness to recover the alkali dicarbadodecahydroundecaborate. The resultant salt can be converted to the salt of other cations by base exchange reactions to thereby obtain the ammonium salts or organic ammonium salts or can be acidified with the addition of a mineral acid or by ion exchange over a hydrogen charged cation exchange resin to prepare dicarbadodecahydroundecaboric acid.

The dicarbadodecahydroundecaborate ions can also be obtained with various substituents bonded to the boron and carbon atoms of the carbollyl cage. These derivatives are attached to the cage atoms by two center bonds. For the simplest case the groups on the cage atoms are terminally bonded hydrogen. The carbon atoms, however, can be substituted with a plurality of groups such as alkyl, e.g., methyl, propyl, isopropyl, ethyl, butyl, amyl, dodecyl, hexadecyl, etc.; aryl and alkaryl, e.g., phenyl, tolyl, xylyl, naphthyl, cumenyl, ethylphenyl, etc.; alkenyl, e.g., propenyl, amyl, butenyl, etc.; halo, e.g., iodo, bromo, chloro, fluoro, carboxyl, e.g., carboxymethyl, carboxyethyl, carboxypropenyl, etc.

The aforementioned substituents can be formed on one or both of the carbons of the dicarborane used as the dicarbadodecahydroundecaborate precursor by use of the appropriately substituted acetylene in the synthesis of the dicarborane from decaborane as previously mentioned. The use of some substituted acetylenes and the identification of the resultant 1 and 1,2-substituted carboranes appears in Inorganic Chemistry, vol. 2, No. 6, 1115–1119. The syntheses comprise reaction of the substituted acetylene with decaborane in an inert solvent and in the presence of a Lewis base such as acetonitrile or diethyl sulfide. Using the appropriately substituted acetylene, the syntheses of the following carboranes is reported: 1-ethyl carborane, 1-propylcarborane, 1-hexylcarborane, vinylcarborane, 1-phenylcarborane, 1-beta-bromoethylcarborane, 1 - chloromethylcarborane, 1-beta-chloroethylcarborane, 1,Ω-chloropropylcarborane, 1-carboranylmethyl acetate, 1-carboranylmethyl acrylate, 1-carboranylglycol diacetate, 1-carboranylethylidene dipropionate, 1-methyl - 2 - carboranylethylidene dipropionate, 1,2 - bis(alphamethylvinyl) carborane, 1,2 - bis(chloromethyl) carborane, 1,2-bis(carbomethoxy)carborane, 1-methyl-2-bromomethylcarborane, 1,2-diisopropylcarborane, 1,2-bis-(hydroxymethyl)carborane, 1-hydroxymethyl-2-(γ-hydroxy-α-propyl)-carborane, diethyl-2,2-bis(1-carboramylmethyl)-malonate and 1-bromomethyl-2-methylcarborane.

CARBON SUBSTITUTED DERIVATIVES

The hydrogen bonded to the carbon of the dicarborane or of the dicarbadodecahydroundecaborate anion exhibits the similar reactivity as the hydrogen on acetylene and accordingly a cage carbon atom can also be substituted by any of the reactions employed for substitution on acetylene. Thus, the carborane or dicarbadodecahydroundecaborate can be alkylated by reaction with an alkyl halide in the presence of a Lewis acid such as aluminum or ferric bromide or chloride; see U.S. Pat. 2,999,117; to substitute the cage carbon atoms with an alkyl or aryl group.

The cage carbons can also be substituted wtih a variety of groups by the Grignard reaction. In this reaction, the 1- or 1,2-halo substituted carborane or carbollide is reacted in an inert solvent, e.g., ethyl ether, with magnesium to form a Grignard reagent which readily undergoes standard Grignard reactions to substitute the cage carbons. This reaction is described in the aforecited publication and in Inorganic Chemistry, vol. 2, No. 6, pages 1115–1125 (December 1963). The carboranyl Grignard reagent, e.g., 1-carboranylmethylmagnesium bromide can be treated with: (1) alkyl or alkenyl ketones or aldehydes to prepare secondary and tertiary carboranyl alcohols, (2) formaldehyde to prepare a primary carboranyl alcohol, or (3) alkyl, aryl or alkenyl halides to prepare alkyl, aryl or alkenyl halides to prepare alkyl, aryl or alkenyl substituted carboranes. (4) acetals to prepare alkyl carboranyl ethers, or (5) nitriles to prepare carbonyl ketones.

Examples of reactants which can be used are: formaldehyde, acetaldehyde, propionaldehyde, butyraldehyde, isobutyraldehyde, methylethyl ketone, diisopropyl ketone, benzaldehyde, crotonaldehyde, acrolein, etc.; ethyl chloride, methyl bromide, allyl bromide, chlorobenzene, amyl fluoride, chloronaphthalene, etc.; 1,1-dimethoxy ethane, 1,1-diisopropoxy butane, 1-1-diethoxy hexane, etc.; acetonitrile, acrylonitrile, benzonitrile, crotonitrile, valeronitrile, methacrylonitrile, butyronitrile, isobutyronitrile, capronitrile, etc. The choice of solvent can also influence the product obtained from the Grignard reaction, e.g., it has been reported that when allyl bromide was reacted with the Grignard reagent, 1-carboranylmethylmagnesium bromide, the normal reaction yields 4-(1-carboranyl)-1-butene; however with tetrahydrofuran as the solvent, 1-allyl-2-methylcarborane is obtained.

The carborane intermediate can also be reacted with alkyl and aryllithium reagents, e.g., butyl or phenyl lithium, at temperatures from 0° to 30° C. to provide the 1-lithium and 1,2-dilithium carboranes which can then be reacted to produce carboranyl acids, carbinols and halides. To illustrate, the contacting of dilithium dicarborane with carbon dioxide at temperatures from 0° to 25° C. forms the lithium salt of 1,2-carboranedicarboxylic acid from which the acid can be formed by acidification. Contacting the lithium carborane with an alkylene oxide, e.g., ethylene oxide, yields the hydroxyalkyl derivatives, e.g., 1,2-bis-(hydroxyethyl)-carborane. The carboranediformyl halides can be obtained by reaction of the lithium salt of 1,2-carboranedicarboxylic acid with excess oxalyl chloride. The resultant acid chloride can then be reacted with alkyl cycloalkyl and alkenyl alcohols to form esters of the 1,2-carboranedicarboxylic acid. The disubstituted carboranes have also been found to exhibit a strong tendency to form 1,2-exocyclic derivatives. Treatment of the bis(hydroxy)-carboranes with an acid such as concentrated sulfuric at temperatures from 100° to 175° C. forms cyclic ethers. Upon heating to about 250°–300° C. the bis(2-carboxy-1-carboranylmethyl)ether form 2 moles of a carboranyl lactone, $B_{10}H_{10}CCH_2OC(O)C$; and the 1,2-dicarboranedicarboxylic acid forms a cyclic anhydride by contacting with dehydrating agents such as thionyl chloride in the presence of sodium carbonate.

BORON SUBSTITUTED DERIVATIVES

The hydrogen bonded to the boron of the icosahedral cage is also bonded with a two-center bond and these hydrogen atoms can be replaced with various substituents. Simple halogenation of the carborane or dicarbadodecahydroundecaborate anion will first halogenate the boron atoms to provide anions containing up to 10 bromo, fluoro, chloro or iodo atoms. A description of the halogenation as applied to chlorination of dicarborane appears in Inorganic Chemistry, vol. 2, No. 6, pages 1092–1096 (December 1963). This reaction comprises contacting the carborane or the biologically active anion in an inert solvent with gaseous halogen, e.g., chlorine. The boron atoms are halogenated first before halogenation of the carbon atom or atoms. The degree of halogenation can be controlled by limiting halogen concentration or the solvent, e.g., carbon tetrachloride, to precipitate the halogenated carboranes as the di, tri, tetra, hexa, octa, deca and undeca-halocarborane.

The dicarbadodecahydroundecaborate anion can also be obtained having one or two of the cage boron atoms in the upper plane, i.e., atoms 4, 8 and 7 of the icosahedron substituted with an alkyl, aryl, alkaryl, aralkyl, alkenyl, aralkenyl, etc. group. A procedure that can be used to prepare the boron substituted derivatives comprises reforming the carborane from the dicarbadodecahydroundecarborate anion using an organic boron halide. The resultant boron substituted carborane can then be treated with strong base or alkali metal halide to abstract a boron atom from the cage and form the boron substituted dicarbadodecahydroundecaborate anion. This procedure can be repeated to prepare a disubstituted dicarbadodecahydroundecaborate anion having two of the open face borons substituted with an organic group. This procedure is illustrated in the examples and briefly comprises reaction of the acid or a soluble salt of the acid, e.g., an alkali metal dicarbadodecahydroundecaborate with an organic substituted boron halide. This reaction is performed at ambient conditions at temperature and pressure and proceeds as follows:

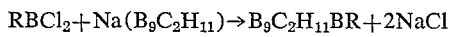

$$RBCl_2 + Na(B_9C_2H_{11}) \rightarrow B_9C_2H_{11}BR + 2NaCl$$

wherein R contains from 1 to about 10 carbons and is alkyl, alkenyl, aryl and halo, carboxy or sulfo derivatives thereof. Examples of suitable R groups are methyl, carboxymethyl, chloromethyl, ethyl, isopropyl, amyl, dodecyl, octadecyl, phenyl, p-bromophenyl, 2-lauryl-4-sulfophenyl, xylyl, tolyl, naphthyl, dichlorophenyl, vinyl, allyl, butenyl, etc.

The resultant boron substituted carborane can then be reacted in the manner previously described to abstract a boron hydride from the icosahedron structure and thereby form a B-substituted dicarbadodecahydroundecaborate ion with the organic substituent on a boron atom in the open face of the truncated icosahedron. Repeated insertion of a like or differently substituted boron atom provides a route to B,B'-disubstituted dicarbadodecahydroundecaborate ions.

The desiccant-defoliant compositions of the invention can be prepared by combining one or a mixture of the aforedescribed dicarbadodecahydroundecaboric acid or its salts with an inert liquid or solid pesticidal carrier material in the conventional manner. Thus, one or a mixture of such dicarbadodecahydroundecaboric acid or salt thereof may be dispersed or dissolved in water with the aid of a dispersing agent, when necessary, to form a concentrate composition which can subsequently be diluted with water to form a spray suitable for application to the living plants prior to harvesting. Alternatively, the product may be admixed with an inert solid carrier material such as talc, starch, diatomaceous earth, aluminum silicate, etc., to form dusting compositions which can be employed as such or dispersed in an aqueous or oleaginous vehicle to form a spray.

Various surface active agents can be incorporated in the desiccant or defoliant compositions in accordance with the practice of the art in formulating such compositions. The surface agents can be used in amounts from 0.01 to 10 weight percent of the compositions or from 0.5 to about 35 weight percent of the concentrates used to prepare the desiccant or defoliant compositions by admixture with a carrier material to form a spray or dusting powder. The surface active agent can be anionic, cationic or nonionic.

Examples of the cationic surfactants include: fatty amines, e.g., dodecylamine, octadecylamine (Armeens, Duomeens of Armour Chemical Company); alkarylamines, e.g., dodecylaniline, fatty amides such as fatty imidazolines, e.g., undecylimidazoline prepared by condensing lauric acid with ethylene diamine or oleylaminodiethylamine prepared by condensing oleic acid with asymmetric diethylene diamine (Sapamide CH by Ciba); quaternary alkyl and aryl aammonium salts and hydrates, e.g., cetyltriethyl ammonium cetyl sulfate, dimethylbenzyldodecyl ammonium chloride, etc.; quaternary ammonium bases of fatty amides of disubstituted diamines, e.g., oleyl methylamino ethylene diethylamine methyl sulfate (Sapamine MS by Ciba), oleylbenzylamino ethylene diethylamine hydrochloride (Sapamine ECH by Ciba); fatty derivatives of benzimidazolines such as are prepared by condensation of a fatty acid with orthophenylenediamine followed by alkylation of the condensate with an alkyl halide to yield an N-alkyl alkylbenzimidazole, e.g., N-methyl N'N'-diethyl heptadecylbenzimidazole; N-fatty alkkyl pyridinium compounds, e.g., lauryl pyridinium, octadecyl pyridinium (Fixanol C of Imperical Chemical Industries), octadecyl methylene pyridinium acetate, etc.

Examples of useful anionic surface active agents include the following: fatty acid glyceride sulfonates and fatty acid sulfonates, e.g., sulfonated cottonseed oil, sulfonated oleic acid, sulfonated sperm oil, sulfonated tallow, etc.; sulfonated fatty amides, e.g., sulfonated amide of ricinoleic acid (Humectol CA by I. G. Farben), sodium salt of sulfuric ester of oleyl diisobutyl amide (Dismulgen V of I. G. Farben), etc.; sulfonated anilides of fats, e.g., sodium salt of sulfuric ester of oleyl-ethyl anilide (Humectol CX by I. G. Farben), etc.; amides of aminosulfonic acids, e.g., sodium sulfonate of oleylmethyltauride (Igepon T by I. G. Farben); amides from condensation of fatty acid chlorides with amino acids, e.g., sodium salt of oleyl sarcoside (Medialan A by I. G. Farben); sulfonated aromatic hydrocarbons, e.g., benzene sulfonic, naphthalene sulfonic acids and their ammonium and alkali metal salts, etc.; alkylaryl sulfonates, e.g., dodecylbenzene sulfonates, octadecylbenzene sulfonates, etc.

Illustrative non-ionic compounds include the polyethylene oxide condensate with hydrophobic groups having a reactive hydrogen. The hydrophobic group can have from about 10 to 25 carbon atoms and from 2 to about 15 molecular weights of ethylene oxide are commonly condensed per molecular weights of hydrophobic group. The hydrophobic group can be selected from a variety of organic compounds having one or more reactive hydrogens including fatty alkyl or alkenyl alcohols, fatty acids, fatty amines, fatty amide, esterified hexitans or alkyl or alkenyl phenols.

As described, the source of the hydrophilic group is ethylene oxide. Other source materials can be employed, for example, ethylene chlorohydrin, or polyethylene glycol; however, because of its low cost and availability, ethylene oxide is used almost exclusively in the preparation of these materials.

The hydrophobic reactant can comprise an alkyl or alkenyl phenol wherein the alkyl or alkenyl group or groups contain between about 2 and about 16 carbon atoms. Among such compounds are the following: hexyl phenol, hexadecyl phenol, dodecenyl phenols, tetradecyl phenol, heptenyl cresol, octyl and octenyl cresol, lauryl cresol, isoamyl cresol, decyl resorcinol, cetenyl resorcinol, isododecyl phenol, decenyl xylenol, etc. Examples of commercially available wetting agents belonging to this class and having a fatty acid constituent and containing ethylene oxide are the following: "Ninosol 100," "Ninosol 200" and Ninosol 210" of the Alrose Chemical Company, and "Nopalcol 4–D" of the Nopco Chemical Company.

A third class of hydrophobic reactants comprises the alkyl and alkenyl alcohols containing between about 8 and about 22 carbon atoms. Among such alcohols are dodecanol, tridecanol, tetradecanol, pentadecanol, hexadecanol, heptadecanol, cotadecenol, decosenol, etc. A commercially available wetting agent of this type and containing ethylene oxide is Brij 30 of The Atlas Powder Company.

A fourth class of the hydrophobic reactants comprises long chain alkyl or alkenyl amines or amides containing between about 8 and about 22 carbon atoms. These compounds contain two reactive hydrogens and the polyethylene oxide units are distributed therebetween. Examples of such compounds are dodecanamide, tridecyl amine, tetradecenamide, pentenyl amine, hexadecyl amine, heptadecanamide, octadecyl amine, oleic amide, etc. Examples of commercially available wetting agents in this group containing ethylene oxide are "Ethomide" of The Armour Chemical Company and "Priminox 10" of the Rohm and Haas Chemical Company.

Another class of suitable wetting agents are the reaction products of ethylene oxide with fatty acid partial esters of hexitans. Such compounds are obtained by treating a hexitol, e.g., sorbitol, mannitol, dulcitol, etc., with a dehydrating agent to form the corresponding hexitan, i.e., sorbitan, mannitan, dulcitan, etc. The hexitan is then partially esterified with a long chain fatty acid, having between about 8 and about 22 carbon atoms, such as dodecanoic acid, pentadecanoic acid, hexadecanoic acid, oleic acid, stearic acid, etc., to replace one of the reactive hydrogens of the hexitan with the carboxylic radical. The resultant partial ester is then reacted with ethylene oxide. Commercially available compounds of this type are "Tween 65" and "Tween 81" of The Atlas Powder Company.

Very suitable emulsifiers comprise the organic substituted ammonium salt of sulfodicarboxylic acids that are reacted with various hydrophobic groups such as fatty amides having 12 to 18 carbons to prepare half amides in the manner described in 2,976,209, or with fatty amines having 12 to 26 carbons to prepare half amides in the manner described in 2,976,211, or with polyethoxylated fatty amines in the manner described in 3,080,280, or with fatty acid esters of hydroxyl amines to obtain half amides in the manner described in 2,976,208.

A preferred emulsifier comprises the amine salts of a sulfodicarboxylic acid half ester of an alkylphenoxy ethoxy alcohol. These emulsifiers have the following structure:

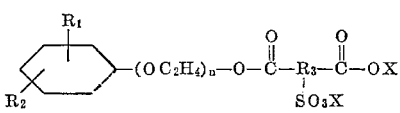

wherein:

$R_1$ is selected from the class consisting of alkyl and alkenyl groups;
$R_2$ is selected from the class consisting of hydrogen, alkyl and alkenyl groups;
$R_3$ is selected from the group consisting of divalent sulfo-alkylene and sulfo-alkenylene groups;
X is an organic alkyl, aryl and heterocyclic amine cation having from 1 to about 6 carbon atoms;
$n$ is an integer between about 2 and about 5;
and the total of carbons in any $R_1$, $R_2$, $R_3$ group is less than about 12; and preferably less than about 6.

Examples of suitable radicals from which $R_1$ and $R_2$ can be selected are the following: methyl, ethyl, propyl, isopropyl, butenyl, isobutyl, amyl, isoamyl, heptenyl, isoheptenyl, octyl, isooctenyl, nonyl, isononyl, decenyl, isodecyl, undecyl, isoundecenyl, dodecyl, isododecyl, etc.

Examples of various $R_3$ groups are the following: methylene, ethylene, propylene, isopropylene, butylene, isobutylene, pentylene, isopentylene, hexylene, isohexylene, etc.

Various organic amine cations can be used for X such as the primary, secondary and tertiary alkyl, alkaryl and aryl amines as well as heterocyclic compounds containing a basic nitrogen. Examples of suitable amines are the following: methylamine, dimethylamine, ethylamine, triethylamine, diethyl benzylamine, propylamine, isopropylamine, diisopropylamine, ethylpropylamine, butylamine, isobutylamine, diisoamylamine, hexylamine, heptylamine, isocetylamine, furanamine, benzylamine, morpholine, pyridine, etc. Preferred are the alkylamines having between 1 and about 6 carbons, e.g., isopropylamine.

Examples of various compounds useful as emulsifiers in my invention are the following: half isobutyl amine salt, half tetraethoxy xylenol ester of sulfo-glutaric acid; half isopropylamine salt, half triethoxy amyl phenol ester of sulfo-adipic acid; half amylamine salt, half pentaethoxy cresol ester of sulfo-pimalic acid; half hexylamine salt, half diethoxyoctyl phenol ester of sulfo-suberic acid; half isopropylamine salt, half diethoxy dodecyl phenol ester of sulfo-azelaic acid, half heptylamine salt, half diethoxy dodecyl phenol ester of sulfo-sebacic acid, etc.

Of the aforedescribed emulsifier compounds, the most preferred are those in which the total of carbons in any $R_1$, $R_2$ or $R_3$ group is less than 4 and the number of carbons in the $R_3$ group is 2 or 3. In this most preferred group, $n$ preferably equals 2.

The aforementioned emulsifiers are readily prepared by reacting at about 100° C. an unsaturated acid anhydride, e.g., maleic anhydride with a hydrophobic group comprising polyethylene oxide condensate on an alkylphenol. The resultant half ester is then reacted with an organic amine to prepare the salt which is reacted in an alcohol or aqueous media at 60°–85° C. with an amine bisulfide to add the amine sulfonate group to the olefinic bond of the dicarboxylic acid. The aforementioned emulsifiers are also available from the Witco Chemical Company under Emcol H2A designation.

In general, any of the conventional formulation techniques may be followed in employing the present dicarbododecahydroundecaborate anions as active components in desiccant or defoliant compositions and any of the wetting agents, spreaders, sticking agents, diluents, carriers, etc., which are conventionally employed in formulating desiccant-defoliant compositions may be used in combination with the present dicarbadodecahydroundecaborate biologically active anions.

The dicarbadodecahydroundecaborate anion containing compositions are effective desiccants and defoliants in relatively small quantities and in the interest of economy they can be formulated in concentrations of the order of 50–50,000 parts per million. The final compositions themselves are of course employed in area dosages sufficient to secure the desired degree of defoliation or desiccation which amounts depend to some extent upon the particular dicarbadodecahydroundecaborate anion which is employed as the active ingredient as well as upon the method by which the composition is applied. A preferred embodiment of the invention lies in the use of aqueous solutions of the water soluble acid, alkali metal and ammonium salts of the unsubstituted dicarbadodecahydroundecaborate anion, e.g., potassium or hydrogen dicarbadodecahydroundecaborate, which is applied to the plants to provide an amount comprising about 0.05 to 25 pounds; preferably from 0.5 to 5 pounds; of the active ingredient per acre of crop.

The dicarbadodecahydroundecaborate anion containing materials are usually marketed in concentrate form, with dilution to the ultimate concentration being effected by the consumer at the point of use. Liquid concentrate compositions usually contain between about 1 and about 15 percent by weight of the active ingredient and sufficient of an emulsifying or dispensing agent to maintain the active ingredient uniformly dispersed in an inert liquid suspending medium. Solid concentrates usually contain between about 5 and about 50 percent by weight of the active ingredient and, optionally, small amounts of spreading agents and other conventional adjuvants.

The use of the active agents for the defoliation and desiccation of plants is accomplished simply by the application of the active materials to the soil surrounding the plant or to the foliage of the plant in the amounts previously mentioned which are effective to cause defoliation and/or desiccation. In commercial use, the application can be most simply effected by use of an aqueous solution of the active component with or without a surface active agent which is applied to the crop at a spray volume dosage of from 10 to 500 gallons per acre. Low volumes, from 10 to about 50 gallons, and preferably from 15 to 30 gallons per acre, are used with aerial applications whereas somewhat greater volumes, from 50 to about 300 gallons per acre are used with ground or surface sprayers.

The applications of the compositions are made to the crop from 2 days to several weeks before the harvesting date. The harvesting date is determined by the maturity of the crop in the conventional manner. Most of the crops such as cotton, milo, sugar cane, sugar beets, potatoes, peppers and tomatoes are machine harvested and the prior application of the defoliant-desiccant compositions greatly facilitates the harvesting by removing or drying the plant's foliage and thereby preventing it from interfering with efficient machine operation. Bare root roses can also be prepared by the application of the solutions to the rose plant to effect defoliation and desiccation and thus induce dormancy of the plant. This application can be made in the fall or winter to obtain bare root roses for spring planting.

The following examples will illustrate the preparation of the active dicarbadodecahydroundecaborate compositions and illustrate the preparation of typical desiccant-defoliant compositions containing various members of the dicarbadodecahydroundecaborate family of active ingredients:

EXAMPLE 1—PREPARATION OF CARBORANE

This example illustrates the preparation of 1,2-dicarbaclovododecaborane(12) from decarborane and acetylene. The preparation is performed in a one-liter, round-bottom, three-necked flask which is fitted with an automatic temperature control device in one of the necks, a spark-free stirring motor with a stirring rod extending through the center neck, and a water-cooled condenser attached to the remaining neck. The condenser connection has a concentric tube used for introduction of acetylene and this tube is extended to beneath the liquid level of the reactants in the round bottom flask. The water-cooled condenser is placed upright for total reflux and the upper end of the condenser is fitted with a U-shaped, Dry Ice cooled condenser and the gases from the Dry Ice condenser are passed into an empty 125 milliliter Erlenmeyer flask and then below the liquid level of a similar flask partially filled with oil.

The gas introduction train consists of a nitrogen cylinder and an acetylene cylinder which are manifolded into a purification train comprising a first 1000 milliliter Erlenmeyer flask and then three 500 milliliter round-bottom flasks connected in series having gas introduction tubes at the bottom of the flask fitted with extra coarse gas dispersion tubes and filled from ⅓ to ½ with concentrated sulfuric acid. The gas exit from the last purification flask is passed to an empty 1000 milliliter Erlenmeyer vessel and then to the base of a column three feet in height that is packed with a mixture of potassium hydroxide and a drying agent such as anhydrous calcium sulfate. The top of the column is connected to another empty 1000 milliliter Erlenmeyer flask and the gases are removed from this Erlenmeyer flask and passed to the tube extending through the neck of the 1000 milliliter reaction vessel. The empty Erlenmeyer flasks are employed to serve as traps for liquids which may inadvertently back up through the system. The empty trap between the sulfuric acid and the potassium hydroxide column is used to collect any sulfuric acid foam from the last purification vessel.

The system is thoroughly dried and flushed with nitrogen before the reagents are introduced. Thereafter 100 grams of decaborane which has been purified by sublimation or recrystallization from a hydrocarbon such as heptane are dissolved in 200 milliliters of n-propyl ether which has been freshly distilled from a mixture containing sodium and benzophenone. The solution is placed in the 1000 milliliter 3-necked flask and 200 milliliters of diethylsulfide which has been dried by passage over a dehydrated 4-angstrom molecular sieve are thereafter added. Nitrogen is then passed through the flask while the solution is stirred for three hours at 40° C. and then the temperature is raised to 65°–67° C. and maintained at this temperature for two hours. Thereafter the flask contents are heated to the temperature of 85°±2° C. and 7 mols of acetylene are passed through the purification train and into the reaction vessel over a period of 35 hours. On completion of the reaction the solution has a pale yellow to light orange color.

The reactants are then cooled to room temperature and the reaction mixture is transferred to a one-liter, round-bottom, single-necked flask and the diethylsulfide and n-propyl ether solvent is removed in a vacuum evaporation step. The flask is rotated continuously during the evaporation and is heated with a steam bath. The volatiles are condensed and collected in a Dry Ice trap. Upon removal of the solute and diethylsulfide, the product is a light brown semisolid. The solid is dissolved in 150 milliliters of benzene and the solution is then transferred to a three-liter, three-necked flask fitted with a stirrer, condenser and pressure equalized, closed addition funnel. The addition funnel is also fitted with a connection to a source of nitrogen so that nitrogen can be used to purge and sweep the flask contents. Over a two-hour period a solution of 150 milliliters of acetone, 400 milliliters methanol and 150 milliliters concentrated hydrochloric acid are introduced into the flask to convert the reactive byproducts to hydrogen and borates. The flask contents are stirred for an additional 12 hours until no more gas is evolved and the resultant solution is then placed in a one-liter addition funnel and added slowly to three gallons of water maintained at a temperature of 95°–100° C. Some decomposition of additional byproducts occurs; the hydrochloric acid and acetone are extracted into the water phase and the benzene is vaporized from the system. The aqueous mixture is stirred for an additional 10 minutes and the crude carborane which separates as a solid in the aqueous phase is removed and dissolved in 500 milliliters methanol in a two-liter Erlenmeyer flask.

The crude carborane is then purified by the addition of a solution of 50 grams potassium hydroxide in 75 milliliters of water and agitated for 3 minutes, then poured into 3 gallons of ice water, stirred for 10 minutes, and filtered. The filtered solid is dried in a vacuum over phosphorus pentoxide and the dried product is mixed with 30 grams anhydrous calcium chloride and placed in thimble of a Soxhlet extraction apparatus. The mixture is extracted with 500 milliliters of heptane for 20 hours. The carborane is recovered from the heptane by crystallization and filtration by placing the heptane in a rotary evaporator heated with a steam bath to evaporate the heptane to 50 milliliters. After separation of the carborane, the filtrate is cooled and a second crop of carborane is obtained. The combined yield after drying is about 85 grams and an additional 3 to 4 grams of impure material may be obtained by evaporating the hexane solution to dryness. In repeated runs this impure material can be added to the mixture in the Soxhlet thimble for further purification.

EXAMPLE 2—PREPARATION OF BROMOMETHYLCARBORANE

The following illustrates the preparation of 1-bromomethyl-1,2-dicarbaclovodecaborane(12). A three-necked flask and the apparatus described in the previous experiment is employed in the preparation of the bromomethylcarborane. The reaction flask is purged and filled with nitrogen, then charged with 49.9 grams decaborane, 32 milliliters acetonitrile, 35 milliliters propargyl bromide and 350 milliliters of benzene. The solution is stirred and heated at reflux temperature for two hours and thereafter the introduction of the propargyl bromide is initiated by introduction of 11 milliliters of the propargyl bromide through a nitrogen-filled addition funnel dropwise over a one-hour period. The addition funnel is then removed, the flask stoppered and the solution is maintained at reflux temperature for 1½ hours and then the flask is unstoppered, the addition funnel is replaced, and an additional quantity of 11 milliliters propargyl bromide is introduced. After 1½ hours of stirring of the flask contents at reflux temperature, the remainder of the propargyl bromide is introduced and the flask contents are again stirred for 1½ hours at reflux temperature.

The solution is then cooled to room temperature and washed with benzene into a single necked flask. The solvent is removed from the flask using a water aspirator vacuum and gentle heating from a steam bath. The residue in the flask is then cooled to room temperature, removed from the vacuum and 200 milliliters of hexane is added and stirred with the residue to extract most of the carborane. The hexane extract is decanted and the brownish tar is again extracted with 40 milliliters of hexane. The second extraction converts the tar residue to a solid which is removed by filtration and washed on the filter with an additional 40 milliliters of hexane. The combined hexane extracts are filtered and washed in a separatory funnel with four 100 milliliter portions of chilled aqueous 10 weight percent sodium hydroxide solution and then with four 100 milliliter portions of water. The hexane solution, yellow in color, is dried over anhydrous magnesium sulfide and filtered and the solvent is then evaporated in a rotary evaporator using a water aspirator.

The carborane remaining in the evaporator flask is washed with a small amount of pentane into a single necked 300 milliliter flask which is attached to an alembic column. Glass wool is placed in the solution, in the neck of the alembic distillation column, and at the top of the column to inhibit bumping during the distillation. The distillation flask, collecting flask and column are continuously evacuated with a high vacuum system. When the bulk of the pentane and residual hexane have distilled away, the temperature of the water bath surrounding the distillation flask is raised from room temperature to 125° C. over a one-hour period. When the distillation rate slows appreciably, the flask contents are raised to 150° C. and maintained there until no more distillate is obtained. The distillation flask is then cooled to room temperature, the vacuum is reduced on the system, and the product is removed to recover 86.5 grams of distilled product. The bromomethylcarborane may be further purified by crystallization from pentane or methanol if desired.

EXAMPLE 3—METHYLCARBORANE

The following describes the preparation of 1-methyl-1,2-dicarbaclovodecaborane(12). This material is prepared by hydrolysis of the Grignard reagent formed from the reaction of bromomethylcarborane; see the preceding preparation; with magnesium in the presence of diethylether. The preparation is carried out in a one-liter, 3-necked flask equipped with a mechanical stirrer, reflux condenser, pressured equalized, closed addition funnel and nitrogen inlet. The flask is maintained filled with nitrogen throughout the course of the reaction. The flask is charged with 6.1 grams magnesium chips, 50 milliliters of anhydrous diethylether, warmed to 30° C., and then a solution of 50 grams of distilled bromomethylcarborane dissolved in 300 milliliters of anhydrous diethylether is introduced slowly into the flask while the flask contents are stirred. The flask is gently warmed to reflux temperature and then the heating mantle is removed and the addition of the carborane solution is maintained at a rate sufficient to maintain the reflux temperature. The bromoethylcarborane solution is added within about 35 minutes and the stirred reaction mixture is then maintained at reflux temperature by heating for 2½ hours.

The solution is then cooled to room temperature and is decanted from the excess magnesium into a 2-liter beaker half-filled with crushed ice. The carboranyl magnesium bromide is washed into the ice mixture with two 50 milliliter portions of diethylether. Hydrochloric acid of 3 normality in a sufficient quantity to dissolve the magnesium salts is added to the stirred ice mixture and the ether and water layers are separated. The water layer is extracted three times with 75 milliliter portions of diethyl-ether. After the combined ether extracts are dried over anhydrous magnesium sulfate, the ether is removed in a rotary evaporator. The evaporator flask contents are then dissolved in 90 milliliters of hot methanol and the solution is permitted to cool slowly to 0° C. The methyl carborane crystallizes from the methanol and is filtered therefrom. A portion of the methanol liquor is removed, heated and water added to the solution until it becomes cloudy. The solution is then cooled to 0° C. to obtain an addition crop of methyl carborane crystals. The combined crops are dried in a vacuum to yield 31 grams of methyl carborane.

EXAMPLE 4—DIMETHYLCARBORANE 1,2-dimethyl-1,2-dicarbaclovodecaborane(12) is prepared by the hydrolysis of the Grignard reagent formed from the reaction of bromomethylcarborane with magnesium in the presence of tetrahydrofuran.

A one-liter, three-necked flask equipped with a mechanical stirrer, reflux condenser, addition funnel and nitrogen inlet is thoroughly dried and flushed with nitrogen. Into the flask is placed 6.1 grams of clean magnesium chips and about 15 milliliters of tetrahydrofuran. The closed addition funnel is charged with 50 grams of distilled bromomethylcarborane dissolved in 250 milliliters of tetrahydrofuran. About 50 milliliters of the solution is then rapidly added to the stirred magnesium suspension to cause initiation of the Grignard reaction. The rate of addition is controlled thereafter so that the heat of the reaction is sufficient to maintain reflux temperature. After addition is complete, the flask is maintained at reflux temperature for an additional 2.5 hours.

The cooled reaction solution is rapidly decanted under nitrogen from the excess magnesium into a second one-liter, three-necked flask equipped with a mechanical stirrer, addition funnel, Dry Ice condenser and nitrogen inlet. The addition funnel of this flask is charged with 48 grams of methyl iodide and the methyl iodide is then added dropwise to the solution in the flask at an addition rate to maintain a reflux temperature. Upon completion of the addition of methyl iodide, the solution is maintained at the reflux temperature for an additional 3 hours and then cooled. The cooled mixture is then slowly added to about 400 milliliters of chilled dilute 1 N hydrochloric acid. The product is extracted with 250 milliliters of diethylether and then with 375 milliliter portions of diethylether. The combined ether extracts from the aqueous phase are washed once with 75 milliliters of water and then dried over magnesium sulfate. The diethylether solvent is then evaporated under vacuum using a rotary evaporator and the flask contents are then dissolved in ethanol. The product is separated from the ethanol by crystallization by cooling the ethanol and additional crops of crystals are obtained from the mother liquid by concentrating the mother liquor and adding water to the solution until it becomes cloudy and then cooling the solution to 0° C. The total of 33 grams of product is crystallized from the ethanol liquor.

EXAMPLE 5—PHENYLCARBORANE 1-phenyl-1,2-dicarbaclovododecaborane(12), ortho isomer, is prepared from decaborane, acetonitrile and phenylacetylene following a procedure similar to that set forth in experiment 2 for the preparation of bromomethylcarbonane. The reaction flask is charged with 50 grams purified decaborane, 22 milliliters acetonitrile and 500 milliliters benzene. The solution is refluxed for two hours and thereafter the 42 grams of phenylacetylene is added dropwise and the mixture is then refluxed for 30 hours. The solvent is removed under vacuum in a rotary evaporator, the residue is extracted with 1 milliliter pentane and the pentane solution is washed 4 times with 100 milliliter portions of 10 weight percent sodium hydroxide solution. The pentane solution is then dried over anhydrous magnesium sulfate and the solvent is removed with a rotary evaporator at reduced pressures to give 61.5 grams of crystalline phenylcarborane.

EXAMPLE 6—PHENYLCARBORANE ISOMERIZATION 1-phenyl-1,7-dicarbaclovodecaborane(12), neo isomer, is prepared by thermal rearrangement of the phenylcarborane ortho isomer prepared in the preceding experiment. This thermal rearrangement is performed in a 100 milliliter stainless steel autoclave which is charged with 5 grams of the phenylcarborane of the preceding example. The autoclave is evacuated with a mechanical vacuum pump and then heated electrically to a temperature of 420° C. for 24 hours. After cooling, the contents of the autoclave are dissolved in 30 milliliters of pentane and analyzed by thin layer chromatography to obtain 3.4 grams of the 1-phenyl-1,7-dicarbaclovodecaborane(neo) and 1.5 grams of the unconverted 1-phenyl-1,2-carborane (ortho).

EXAMPLE 7—DIMETHYL DERIVATIVES

The following experiments describe the preparation of the (3)-1,2-dicarbadodecahydroundecaborates:

The 1,2-dimethyl-(3) - 1,2 - dicarbadodecahydroundecaborate(−1); $[B_9C_2H_{10}(CH_3)_2]^{-1}$ is prepared by the treatment of dimethylcarborane with alcoholic base to abstract a boron atom from the carborane. This reaction is performed in a 500 milliliter, three-necked flask equipped with a reflux condenser, a mechanical stirrer and a nitrogen inlet. To the flask is charged a solution of 20 grams potassium hydroxide in 300 milliliters of absolute ethyl alcohol. The solution is cooled to room temperature and then 30 grams of dimethylcarborane is added and the solution is stirred for one hour at room temperature and then heated to reflux temperature and maintained at that temperature until the evolution of hydrogen has ceased. The flask contents are then cooled and an additional 100 milliliters of absolute ethyl alcohol is added and carbon dioxide is then introduced into the solution to precipitate excess potassium hydroxide as the carbonate. The precipitate is removed by filtration and washed five times with 50 milliliter portions of absolute ethyl alcohol. The combined filtrate and washings are evaporated to dryness to yield a crude potassium salt which is water soluble and which can be base-exchanged with other cations such as trimethyl ammonium, cesium, etc., or can be obtained in the acid form by acidification of a salt solution with a mineral acid, e.g., hydrochloric or sulfuric acid. Alternatively, an aqueous solution of the salt form can be passed over a hydrogen charged cation exchange resin such as hydrogen charged Amberlite IR–120.

EXAMPLE 8—OTHER DICARBADODECAHYDROUNDECABORATE DERIVATES

The (1) - 1,2 - dicarbadodecahydroundecaborate(−1) ion, the 1-phenyl-(3)-1,2-dicarbadodecahydroundecaborate(−1) ion, and the (3)-1,7-dicarbadodecahydroundecaborate(−) ion are prepared in the same manner with the exception that the 1,7-isomer is formed under higher temperature conditions than the corresponding 1,2-isomers. This is accomplished by carrying out the initial alcoholic potassium hydroxide degradation in a stirred autoclave under pressure at about 150° C.

EXAMPLE 9

The following example will illustrate various pesticide compositions containing the biologically active hydrodicarbollide components which are present in a dusting composition using a solid carrier.

| Components—Active component | Compositions (weight percent) | | | | | | | |
|---|---|---|---|---|---|---|---|---|
| | 1 | 2 | 3 | 4 | 5 | 6 | 7 | 8 |
| Tetramethylammonium dicarbadodecahydroundecaborate | 0.3 | | | 0.3 | | | | |
| Sodium dicarbadodecahydroundecaborate | | 0.5 | | | | | | |
| Ammonium 1-bromoethyl dicarbadodecahydroundecaborate | | | 1.5 | | | | | |
| Cesium 1,2-dimethyl dicarbadodecahydroundecaborate | | | | | 0.2 | | | |
| Isopropylammonium 1-phenyl dicarbadodecahydroundecaborate | | | | | | 2.5 | | |
| Lithium 1,2-diphenyl dicarbadodecahydroundecaborate | 0.7 | | | | | | 3.0 | |
| Potassium hexachloro dicarbadodecahydroundecaborate | | | | | | | 1.8 | |
| Dicarbadodecahydroundecaboric acid | | | | | | | | 0.1 |
| Carrier: | | | | | | | | |
| Wood flour | 99 | | | | | | | |
| Pumice | | 99.5 | | | | | | |
| Soybean flour | | | 97.5 | | | | | |
| Kaolin | | | | 99.0 | | | | |
| Powdered limestone | | | | | | 96.0 | | |
| Diatomaceous earth | | | | | | 97.0 | | |
| Expanded mica | | | | | | | 95.0 | |
| Adjuvant: | | | | | | | | |
| Sodium dodecylbenzene sulfonate | | | | 1.0 | | | 3.2 | |
| ethylphenoxypoly(ethylene oxide)ethanol | | | | | | 1.5 | | |
| Powdered blood albumin | | | | | 0.5 | | | 0.5 |
| Total | 100 | 100 | 100 | 100 | 100 | 100 | 100 | 100 |

EXAMPLE 10

The following will illustrate pesticidal compositions containing the dicarbadodecahydroundecaborate as the active component thereof which are liquid and suitable for spraying onto the treatment area:

| Components—Active component | Compositions (weight percent) | | | | | | | |
|---|---|---|---|---|---|---|---|---|
| | 9 | 10 | 11 | 12 | 13 | 14 | 15 | 16 |
| Tributylammonium 1-cyclohexyl dicarbadodecahydroundecaborate | 3.0 | | | | | | | |
| Potassium 4-methyl dicarbadodecahydroundecaborate | | 1.5 | | | | | | |
| Sodium 4-methyl-7-phenyl dicarbadodecahydroundecaborate | | | 5.0 | | | | | |
| Triethylammonium 1-ethyl-7-amyl dicarbadodecahydroundecaborate | | | | 0.5 | | | | |
| Potassium 7-allyl dicarbadodecahydroundecaborate | | | | | 2.5 | | | |
| Ammonium dibromo dicarbadodecahydroundecaborate | | | | | | 0.3 | | |
| Triamylammonium tetraiodo dicarbadodecahydroundecaborate | | | | | | | 2.3 | |
| Dicarbadodecahydroundecaboric acid | | | | | | | | 2.7 |
| Carrier: | | | | | | | | |
| Water | 92.0 | 83.0 | 95.0 | 99.5 | 73.0 | 82.0 | 96.0 | 95.0 |
| Summer spray oil [1] | | 10.0 | | | | | | |
| Benzene | | | | | 24.5 | | | |
| Weed oil [2] | | | | | | 15.2 | | |
| Adjuvant: | | | | | | | | |
| Span | 2.0 | | | | | | | |
| Tween | | 5.5 | | | | | | 2.3 |
| Triton TX-45 | | | | | | 1.0 | | |
| Tergitol 4 | | | | | | 2.0 | | |
| Synthetics D-37 | | | | | | | 1.7 | |
| Total | 100 | 100 | 100 | 100 | 100 | 100 | 100 | 100 |

[1] A paraffinic petroleum distillate, boiling range 350° to 470° F. with 92 percent unsulfonated residue.
[2] An aromatic distillate, boiling range 325° to 525° F. obtained from refractory cracked cycle stocks.

EXAMPLE 11

Wettable powder compositions containing dicarbadodecahydroundecaborates were prepared by admixing the active components with an equal weight of an inert powdered solid, and the powders were then extended in water to obtain a spray suspension.

The sprays of active materials and a check spray containing no active material were applied to cotton plants that were in the 4-6 leaf stage at a dosage equivalent to the application of 5 pounds of the active dicarbadodecahydroundecaborate per acre and the plants were evaluated for combined desiccation and defoliation 10 days after application of the sprays. The following table summarizes the results:

| Active component | Defoliation, percent | Desiccation, percent | Combined effectiveness, percent |
|---|---|---|---|
| Potassium neodicarbadodecahydroundecarborate | 60 | 60 | 84 |
| Tetramethylammonium orthodicarbadodecahydroundecaborate | 30 | 40 | 54 |
| Tetramethylammonium ortho-1-phenyldicarbadodecahydroundecaborate | 20 | 40 | 52 |
| Check | 0 | 0 | 0 |

The ratings on defoliation report the percent of original leaves that were defoliated and the desiccation reports the percent desiccation of the leaves remaining on the plant where 100% represents complete desiccation and drying of the leaves.

The data evidence that the presence or absence of activity was independent of the cation associated with the dicarbadodecahydroundecaborate as well as evidencing that the unsubstituted and the carbon substituted dicarbadodecahydroundecaborate anions were both active as defoliants and desiccants. Substantially similar results are achieved when the salts of this example are replaced with an equal amount of the corresponding dicarbadodecahydroundecaboric acid.

EXAMPLE 12

An aqueous spray of an active material was prepared by dissolving potassium 1,2-dimethylorthodicarbadodecahydroundecaborate in water at a concentration of 1 weight percent and adding 1 weight percent of an emulsifier, Emcol H2A, the half isopropyl amine salt, half alkylphenoxy(polyethylene oxide) ester of sulfosuccinic acid.

The aqueous spray was applied to a row of mature cotton plants with a hand propelled spray rig formed from a yoke that straddled the row and that supported five T-jet spray nozzles which directed a five-pointed, star-shaped spray onto the cotton. The aqueous spray was applied to the cotton at two dosages corresponding to 10 and 15 gallons per acre of spray or 0.83 and 1.25 pounds per acre of the active component. The following table summarizes the results.

Dosage (gallons/acre):    Effect
10 _____ Satisfactory desiccation of the leaves with good defoliation after 10 days.
15 _____ Good desiccation of the leaves with some leaves still on plant.

EXAMPLE 13

Aqueous spray solutions were prepared of two active dicarbadodecahydroundecaborates by dissolving one gram of the materials in 10 milliliters acetone and admixing the resultant solution with 15 milliliters water. The aqueous solutions were tested for activity on young immature cotton plants of the SJ-1 variety that were twenty-two inches in height by spraying 5 milliliters onto the plant with a spray that thoroughly wet the foliage. The following table summarizes the materials investigated and the results obtained, using the same rating as in Example 11:

| Active component | Defoliation, percent | Desiccation, percent | Combined effectiveness, percent |
|---|---|---|---|
| Tetramethylammonium orthodicarbadodecahydroundecaborate | 30 | 25 | 45 |
| Tetramethylammonium 1-phenylorthodicarbadodecahydroundecaborate | 73 | 12 | 75 |

The 1-phenyl derivative exhibited complete defoliation of the fully developed leaves; however, the rating was based on the results on all leaves including the incompletely developed leaves that were partially in the bud stage at the time of application. The unsubstituted dicarbadodecahydroundecaborate salt exhibited a lesser degree of defoliation but a greater degree of desiccation.

The preceding examples are intended to illustrate the preferred mode of practice of the invention and to demonstrate results obtainable thereby. While the invention has been illustrated with reference to the defoliation and desiccation of cotton, the compositions are also active for the desiccation and defoliation of other crops such as milo, seed clover and alfalfa, potatoes, peppers, tomatoes, sugar cane, sugar beets, roses, etc. It is intended that the invention be defined by the reagents and steps, and their obvious equivalents, set forth in the following claims:

I claim:

1. The method for facilitating the harvesting of plants that comprises applying to said plants, in an effective amount to cause defoliation and desiccation, the following active material:

$$M[(BX)_m(BR_1)_nCR_2CR_3]$$

wherein:

M is hydrogen, alkali metal or ammonium;

X is halogen or hydrogen;

$R_1$ is alkyl, aryl, alkenyl or haloalkyl having 1 to 5 carbons;

$R_2$ and $R_3$ are halogen, hydrogen or alkyl, aryl, alkenyl, carboxyl or cycloalkyl having from 1 to about 10 carbons;

$n$ is 0, 1 or 2; and $m+n=9$.

2. The method of claim 1 wherein said material is an alkali metal (3)1,2-dicarbadodecahydroundecaborate.

3. The method of claim 1 wherein said material is dissolved in an aqueous solution and the solution is applied to said plants.

4. The method of claim 1 wherein said plants are cotton.

5. The method of claim 3 wherein said aqueous solution also contains from 0.1 to 10 weight percent of a surface active agent.

6. The method of claim 1 wherein said active material has the following empirical formula:

$$M[C_2B_9H_{10}C_6H_5]$$

7. The method of claim 1 wherein said active material has the following empirical formula:

$$M[C_2B_9H_{11}]$$

8. The method of claim 1 wherein M is potassium.

9. The method of claim 1 wherein M is tetramethylammonium.

No references cited.

JAMES A. THOMAS, JR., Primary Examiner